(12) United States Patent
Sogabe

(10) Patent No.: US 6,632,384 B2
(45) Date of Patent: Oct. 14, 2003

(54) PROCESS FOR PRODUCING RESIN MOLDED ARTICLE

(75) Inventor: Satoru Sogabe, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 59 days.

(21) Appl. No.: 09/810,224

(22) Filed: Mar. 19, 2001

(65) Prior Publication Data

US 2001/0033041 A1 Oct. 25, 2001

(30) Foreign Application Priority Data

Mar. 29, 2000 (JP) ....................................... 2000-090952

(51) Int. Cl.$^7$ .............................................. B29C 59/08
(52) U.S. Cl. ........................ 264/80; 264/235; 264/346; 264/469; 156/497
(58) Field of Search .......................... 264/80, 469, 235, 264/346; 156/497

(56) References Cited

U.S. PATENT DOCUMENTS 3,145,242 A * 8/1964 Bryan .......................... 264/80
4,067,942 A * 1/1978 Wilson .......................... 264/80
4,812,274 A * 3/1989 Labaig et al. .................. 264/80
5,028,231 A * 7/1991 Hall ................................ 433/6
5,292,364 A * 3/1994 Hiraiwa et al. ........... 106/287.1
5,376,394 A * 12/1994 Dudenhoeffer et al. ..... 426/415

FOREIGN PATENT DOCUMENTS

EP    0 323 570 A2 * 7/1989

* cited by examiner

*Primary Examiner*—Stefan Staicovici
(74) *Attorney, Agent, or Firm*—Sughrue Mion, PLLC

(57) ABSTRACT

There is provided a process for producing a resin molded article, which includes the steps of:

(1) molding a thermoplastic resin to obtain a resin molded articles; and (2) flame-treating the surface of the resin molded article to obtain a flame-treated resin molded article;

wherein the process does not comprise after the step (2) any further step of printing, adhesive-coating or painting the flame-treated surface of the flame-treated resin molded article obtained in the step (2).

4 Claims, No Drawings

PROCESS FOR PRODUCING RESIN MOLDED ARTICLE

FIELD OF THE INVENTION

The present invention relates to a process for producing easily a resin molded article having a superior impact strength. The resin molded article according to the present invention is used without printing, adhesive-coating or painting on its flame-treated surface.

BACKGROUND OF THE INVENTION

Resin molded articles made of a thermoplastic resin are widely used for parts such as interior or exterior car parts, auto-bicycle parts and parts for household electric appliances. Most of these parts are required to have superior impact strength. There are known some methods for producing resin molded articles having superior impact strength, such as:

(i) a method to use a thermoplastic resin in combination with a filler such as rubber and talc, and (ii) a method to give an impact-absorbable structure to a resin molded article.

It is desired to develop a process for producing easily a resin molded article having superior impact strength.

SUMMARY OF THE INVENTION

It is an object of the present invention to provide a process for producing easily a resin molded article having superior impact strength.

It is known to subject surfaces of plastic goods to flame-treatment in order to improve printing property, adhesion property or painting property thereof. It is also known that impact strength of painted plastic goods obtained by painting the flame-treated plastic goods is lower than that of the original non-flame-treated plastic goods.

The present inventor has undertaken studies about a process for producing easily a resin molded article having superior impact strength. As a result, it has been found that a flame-treated resin molded article has surprisingly higher impact strength than the original non-flame-treated resin molded article, and thereby the present invention has been obtained.

The present invention is to provide a process for producing a resin molded article, which comprises the steps of:

(1) molding a thermoplastic resin to obtain a resin molded article; and (2) flame-treating the surface of the resin molded article to obtain a flame-treated resin molded article;

wherein the process does not comprise after the step (2) any further step of printing, adhesive-coating or painting the flame-treated surface of the flame-treated resin molded article obtained in the step (2).

DETAILED DESCRIPTION OF THE INVENTION

A thermoplastic resin used in the present invention is not limited. Examples of the thermoplastic resin are homopolymers of ethylene; homopolymers of an α-olefin such as propylene, butene-1, pentene-1, hexene-1, 3-methylbutene-1 and 4-methylpentene-1; copolymers of at least two olefins selected from those exemplified above; and copolymers of at least one olefin selected from those exemplified above with at least one comonomer such as vinyl acetate and ethyl acrylate, which comonomer is other than the olefin, and is copolymerizable with the olefin.

Preferred examples of the thermoplastic resin are those containing not less than 50% by mol of a structure unit derived from ethylene, such as high density polyethylene (HDPE), medium density polyethylene (MDPE), low density polyethylene (LDPE), linear low density polyethylene (L-LDPE), ethylene-vinylacetate copolymer (EVA copolymer) and ethylene-ethyl acrylate copolymer, which are hereinafter referred to as "ethylene based resin"; and those containing not less than 50% by mol of a structure unit derived from propylene, such as isotactic polypropylene, syndiotactic polypropylene, propylene-ethylene block copolymer and propylene-ethylene random copolymer, which are hereinafter referred to as "propylene based resin". Among these, the propylene based resin is more preferred.

The above-mentioned thermoplastic resin may be used in combination with at least one thermoplastic elastomer and inorganic filler.

Examples of the thermoplastic elastomer are amorphous random copolymer rubber containing an olefin unit as the main component, such as ethylene-propylene copolymer rubber, ethylene-propylene-non-conjugated diene copolymer rubber, ethylene-butene-1 copolymer rubber, ethylene-butene-1-non-conjugated diene copolymer rubber, propylene-butadiene copolymer rubber and ethylene-octene copolymer rubber. The above-mentioned non-conjugated diene contains, for example, dicyclopentadiene, 1,4-hexadiene, cyclooctadiene, methylnorbornene and ethylidenenorbornene.

As the thermoplastic elastomer, there are additionally enumerated styrene based copolymer rubber such as styrene-butadiene block copolymer, styrene-isoprene block copolymer, hydrogenated styrene-isoprene block copolymer, styrene-grafted ethylene-propylene copolymer rubber, styrene-acrylonitrile-grafted ethylene-propylene copolymer rubber, styrene-grafted ethylene-propylene-non-conjugated diene copolymer rubber and styrene-ethylene-butylene-styrene block copolymer rubber.

Examples of the above-mentioned inorganic filler are talc, mica, wollastonite, calcium carbonate, barium sulfate, magnesium carbonate, clay, alumina, silica, calcium sulfate, carbon fiber, glass fiber, metal fiber, titanium oxide, carbon black, magnesium hydroxide and diatomaceous earth.

The thermoplastic resin may be used in combination with additives such as antioxidants, ultra violet ray absorbers, lubricants, pigments, anti-static agents, copper inhibitors, neutralizing agents and nucleating agents, as far as the object of the present invention is not are not impaired.

In the present invention, the molded article can be obtained from the thermoplastic resin by a conventional molding method. The conventional molding method contains, for example, thermoforming method such as vacuum molding and press molding methods, injection molding method, gas assist injection molding method, sandwich injection molding method, injection compression molding method, injection press molding method, compression molding method, blow molding method, injection blow molding method, sheet molding method and film extrusion molding method.

The resin molded article in accordance with the present invention is not limited in its form and size. Examples of the form are a board like form such as flat plate and a box like form.

The flame-treatment in the present invention can be carried out in any manner containing a conventional one. For example, the flame-treatment can be carried out using a gas torch filled with LPG flammable gas.

The flame-treatment in the present invention can be continued until a difference between a wetting index for the surface of the resin molded article obtained through the flame-treatment and a wetting index for the surface of the resin molded article before the flame-treatment reaches not less than at least 1 dyn/cm, preferably not less than 2 dyn/cm, and more preferably not less than 5 dyn/cm. When the difference, namely an elevation value of the wetting index, is less than 1 dyn/cm, it is apt to fail to obtain the resin molded article having satisfactory impact strength.

The flame-treatment in the present invention can be carried out for a period of time, during which the molded article is not deformed by the flame-treatment. Usually, the treatment period of time is preferably from 1 to 60 seconds, and more preferably from 2 to 55 seconds. A surface temperature of the molded article at the time of the flame-treatment is desired to be not lower than 600° C., and preferably from 630 to 700° C.

When it is possible to expect to which surface of the obtained resin molded article an impact is applied, it is recommendable to apply the flame-treatment to the surface which is the other surface than that to which an impact is applied. For example, when the resin molded article is in a flat plate form, it is recommendable to apply the flame-treatment to the surface opposite to the surface to which an impact is applied.

EXAMPLE

The present invention is illustrated in more detail with reference to Examples, which are not to be construed as limiting the scope of the present invention. The wetting index and impact strength were measured according to the following methods.

1. Wetting Index (dyn/cm)

According to JIS-K 6768, which relates to a wetting test method for a polyethylene film and a polypropylene film, the wetting index was measured through the steps of:

(1) impregnating a swab manufactured by Johnson & Johnson Co., Ltd. with a liquid reagent described in JIS-K 6768 (4.2) up to a degree such that the liquid does not fall in drops, (2) coating the reagent on the surface of a test piece so as to make a coated area of about 6 cm$^2$ in a manner such that the swab is moved on the surface of the test piece placed horizontally in one direction for about 0.5 second, (3) repeating the above-mentioned steps (1) and (2) with use of another reagent having a surface tension higher in rank by 1 than that used above, in case that a liquid layer coated remains for not less than 2 seconds after the coating, wherein the phrase "liquid layer coated remains" means that the liquid layer coated holds a state such that neither rupture nor shrinkage occurs, in other words, holds a state immediately after the coating, (4) repeating the above-mentioned steps (1) and (2) with use of another reagent having a surface tension lower in rank by 1 than that used above, in case that a liquid layer coated remains for less than 2 seconds after the coating, and (5) regarding a surface tension (dyn/cm) of the reagent in case that the remaining time of the liquid layer is closest to 2 seconds as a wetting index of the test piece.

2. Impact Strength (KJ/m$^2$)

According to BS (British Standard) 1330, impact strength of a resin molded article was measured through the steps of:

(1) cutting a resin molded article (injection molded article) from its center portion to prepare a test piece having a size of 10 mm (machine direction)×5 mm (transverse direction), (2) setting the test piece on a chuck equipped to an impact measurement apparatus, a trademark DYNSTAT IMPACT TESTER, manufactured by Tester Sangyo Co., Ltd.

(3) fitting a hammer to the chuck, (4) adjusting a position of the hammer so as to make a distance from the top end of the test piece to a hitting point of the hammer 1.75 times that of a thickness of the test piece, (5) lifting the hammer up to an angle prescribed about respective hammers to be used, and then hanging the hammer on a hook, (6) adjusting an indicator of the impact measurement apparatus to the angle of the hammer, (7) unfastening the hammer from the hook to hit the test piece, and then reading a swinging-up angle of the hammer, and (8) calculating the impact strength from the angle read according to the expression prescribed in BS 1330.

Comparative Example 1

Using an injection molding machine, a trademark of NEOMAT 515/150, manufactured by Sumitomo Heavy Industries, Ltd., a propylene homopolymer, a trademark of Noblen AW 564, manufactured by Sumitomo Chemical Co., Ltd., (melt flow rate (MFR)=30 g/10 min, yield strength= 278 kgf/cm$^2$) was molded at a molding temperature of 220° C. to obtain a molded article of a flat plate form having a size of 120 mm(longitudinal)×120 mm(horizontal)×3 mm (thick).

A wetting index of the surface of the molded article obtained was found to be 30 dyn/cm. The impact strength measured by applying an impact against one surface having a higher gloss than the other surface (the higher gloss surface being hereinafter referred to as "right surface") was found to be 27.7 KJ/m$^2$. Evaluation results are as shown in Table 1.

Example 1

Using a gas torch filled with LPG flammable gas, a trademark of PRINCE GAS TORCH, manufacture by Nihon Gas Co., Ltd., the right surface of a molded article of a flat plate form obtained in a manner similar to that of Comparative Example 1 was flame-treated at a surface temperature of 650° C. for 5 seconds, thereby obtaining a flame-treated resin molded article.

A wetting index of the flame-treated right surface and an impact strength measured by applying an impact against said surface were 32 dye/cm and 36.7 KJ/cm$^2$, respectively. The evaluation results are as shown in Table 1.

Example 2

Example 1 was repeated, except that a flame-treatment time was changed to 10 seconds, thereby obtaining a flame-treated resin molded article. A wetting index of the flame-treated right surface and an impact strength measured by applying an impact against said surface were 34 dye/cm and 37.2 KJ/cm$^2$, respectively. The evaluation results are as shown in Table 1.

Example 3

Example 1 was repeated, except that a flame-treatment time was changed to 20 seconds, thereby obtaining a flame-treated resin molded article. A wetting index of the flame-treated right surface thereof and an impact strength measured by applying an impact against said surface were 45 dye/cm and 40.7 KJ/cm$^2$, respectively. The evaluation results are as shown in Table 1.

Example 4

Example 1 was repeated, except that a back surface of the molded article having a lower gloss was flame-treated, thereby obtaining a flame-treated resin molded article. A wetting index of the flame-treated back surface thereof and an impact strength measured by applying an impact against the right surface were 32 dye/cm and 39.8 KJ/cm$^2$, respectively. The evaluation results are as shown in Table 1.

Example 5

Example 2 was repeated, except that a back surface of the molded article having a lower gloss was flame-treated, thereby obtaining a flame-treated resin molded article. A wetting index of the flame-treated back surface thereof and an impact strength measured by applying an impact against the right surface were 34 dye/cm and 40.5 KJ/cm$^2$, respectively. The evaluation results are as shown in Table 1.

Example 6

Example 3 was repeated, except that a back surface of the molded article having a lower gloss was flame-treated, thereby obtaining a flame-treated resin molded article. A wetting index of the flame-treated back surface thereof and an impact strength measured by applying an impact against the right surface were 45 dye/cm and 43.2 KJ/cm$^2$, respectively. The evaluation results are as shown in Table 1.

TABLE 1

|  | Flame treatment time (sec.) | Wetting index (dyn/cm) | Impact strength (KJ/m$^2$) |
| --- | --- | --- | --- |
| Comparative Example 1 | 0 | 30 | — |
| Example 1 | 5 | 32 | 36.7 |
| Example 2 | 10 | 34 | 37.2 |
| Example 3 | 20 | 45 | 40.7 |
| Example 4 | 5 | 32 | 39.8 |
| Example 5 | 10 | 34 | 40.5 |
| Example 6 | 20 | 45 | 43.2 |

What is claimed is:

1. A process for producing a resin molded article having a higher impact strength than a non-flame treated resin molded article, which comprises the steps of:

(1) molding a thermoplastic resin to obtain a resin molded article; and (2) flame-treating the surface of the resin molded article to obtain a flame-treated resin molded article;

wherein the surface temperature of the molded article at the time of the flame-treatment is not lower than 600° C.; and the process does not comprise after the step (2) any further step of printing, adhesive-coating or painting the flame-treated surface of the flame-treated resin molded article obtained in step (2).

2. The process for producing a resin molded article according to claim 1, wherein the flame-treatment in the step (2) is continued until a difference between a wetting index for the surface of the resin molded article obtained through the flame-treatment and a wetting index for the surface of the resin molded article before the flame-treatment reaches not less than at least 1 dyn/cm.

3. The process for producing a resin molded article according to claim 1, wherein the flame-treatment in the step (2) is applied to a surface which is the other surface than that to which an impact is applied.

4. The process for producing a resin molded article according to claim 1, wherein the thermoplastic resin contains a propylene based resin.

\* \* \* \* \*